(12) United States Patent
Wildgruber et al.

(10) Patent No.: US 9,586,594 B2
(45) Date of Patent: Mar. 7, 2017

(54) MOTOR VEHICLE HAVING A GENERATOR LOAD-DEPENDENT ENGINE CONTROL

(71) Applicant: AUDI AG, Ingolstadt (DE)

(72) Inventors: Mario Wildgruber, Rohrbach (DE); Arthur Waldau, Eichstätt (DE)

(73) Assignee: AUDI AG, Ingolstadt (DE)

(*) Notice: Subject to any disclaimer, the term of this patent is extended or adjusted under 35 U.S.C. 154(b) by 0 days.

(21) Appl. No.: 14/786,884

(22) PCT Filed: Mar. 1, 2014

(86) PCT No.: PCT/EP2014/000532
§ 371 (c)(1),
(2) Date: Oct. 23, 2015

(87) PCT Pub. No.: WO2014/173478
PCT Pub. Date: Oct. 30, 2014

(65) Prior Publication Data
US 2016/0068167 A1 Mar. 10, 2016

(30) Foreign Application Priority Data

Apr. 26, 2013 (DE) .......................... 10 2013 007 277

(51) Int. Cl.
*B60L 9/00* (2006.01)
*B60L 11/00* (2006.01)
(Continued)

(52) U.S. Cl.
CPC ............ *B60W 50/06* (2013.01); *B60W 10/06* (2013.01); *B60W 10/08* (2013.01); *B60W 10/30* (2013.01);
(Continued)

(58) Field of Classification Search
CPC ...... B60W 10/06; B60W 10/08; B60W 10/30; B60W 20/10; B60W 2510/305;
(Continued)

(56) References Cited

U.S. PATENT DOCUMENTS

| | | | | |
|---|---|---|---|---|
| 4,262,209 A | * | 4/1981 | Berner | .................... F02D 29/06 |
| | | | | 174/DIG. 15 |
| 5,539,258 A | * | 7/1996 | Sutton | ...................... H02P 9/06 |
| | | | | 290/40 B |

(Continued)

FOREIGN PATENT DOCUMENTS

| | | |
|---|---|---|
| DE | 19820395 A1 | 11/1999 |
| DE | 10309326 A1 | 10/2003 |

(Continued)

OTHER PUBLICATIONS

International Search Report issued by the European Patent Office in International Application PCT/EP2014/000532.

*Primary Examiner* — Harry Oh
(74) *Attorney, Agent, or Firm* — Henry M. Feiereisen LLC

(57) ABSTRACT

In a method for adjusting an operating variable of an internal combustion engine in a motor vehicle, an electric generator is driven by the internal combustion engine and a current output value of a mechanical driving power required by the generator is repeatedly determined from at least one current parameter value of the generator by an energy management unit. On the basis of the output value, an engine control unit determines a control setpoint for adjusting the operating variable. Sudden load variations at the generator are compensated by monitoring an operating variable of the generator, by determining after a sudden load variation of the electrical load a relative change of the operating variable and by determining an adjusted control setpoint caused by the sudden load variation independently of the output value of (Continued)

the energy management unit and dependent on the relative change in the monitored operating variable.

10 Claims, 2 Drawing Sheets

(51) Int. Cl.

| | |
|---|---|
| *G05D 1/00* | (2006.01) |
| *G05D 3/00* | (2006.01) |
| *G06F 7/00* | (2006.01) |
| *G06F 17/00* | (2006.01) |
| *B60W 50/06* | (2006.01) |
| *F02D 29/06* | (2006.01) |
| *B60W 10/06* | (2006.01) |
| *F02D 41/08* | (2006.01) |
| *F02D 41/02* | (2006.01) |
| *B60W 10/30* | (2006.01) |
| *B60W 30/188* | (2012.01) |
| *B60W 10/08* | (2006.01) |
| *B60W 20/00* | (2016.01) |
| *B60W 30/184* | (2012.01) |
| *B60W 50/00* | (2006.01) |

(52) U.S. Cl.
 CPC .......... *B60W 20/10* (2013.01); *B60W 30/184* (2013.01); *B60W 30/1886* (2013.01); *F02D 29/06* (2013.01); *F02D 41/021* (2013.01); *F02D 41/0205* (2013.01); *B60W 2050/0008* (2013.01); *B60W 2510/305* (2013.01); *B60W 2710/0677* (2013.01); *B60Y 2300/44* (2013.01); *F02D 2250/18* (2013.01); *Y10S 903/902* (2013.01)

(58) Field of Classification Search
 CPC ...... B60W 2710/0677; B60W 30/1886; B60Y 2300/44; F02D 2250/18; F02D 29/06; F02D 41/021; F02D 41/083; Y10S 903/902

USPC .......................................................... 701/22
 See application file for complete search history.

(56) References Cited

U.S. PATENT DOCUMENTS

| | | | | |
|---|---|---|---|---|
| 6,476,510 | B2* | 11/2002 | Soucy | B60L 11/08 290/40 C |
| 7,122,913 | B2* | 10/2006 | Witten | F02B 63/04 123/3 |
| 2003/0022753 | A1* | 1/2003 | Mizuno | B60W 10/06 477/43 |
| 2004/0263131 | A1* | 12/2004 | Suelzle | H02P 9/10 322/28 |
| 2011/0251747 | A1* | 10/2011 | Imai | B60K 6/445 701/22 |
| 2012/0078486 | A1* | 3/2012 | Welschof | F02D 31/008 701/102 |
| 2013/0332016 | A1* | 12/2013 | Suzuki | B60W 30/00 701/22 |
| 2014/0156129 | A1* | 6/2014 | Tabata | B60K 6/48 701/22 |
| 2015/0048773 | A1* | 2/2015 | Akita | H02P 9/30 318/717 |
| 2015/0207376 | A1 | 7/2015 | Wildgruber | |

FOREIGN PATENT DOCUMENTS

| | | |
|---|---|---|
| DE | 1478087 A2 | 11/2004 |
| DE | 102005012052 A1 | 10/2006 |
| DE | 102007057786 A1 | 6/2009 |
| DE | 102008004269 A1 | 7/2009 |
| DE | 102008002152 A1 | 12/2009 |
| DE | 102009013341 A1 | 9/2010 |
| DE | 102010006489 A1 | 8/2011 |

\* cited by examiner

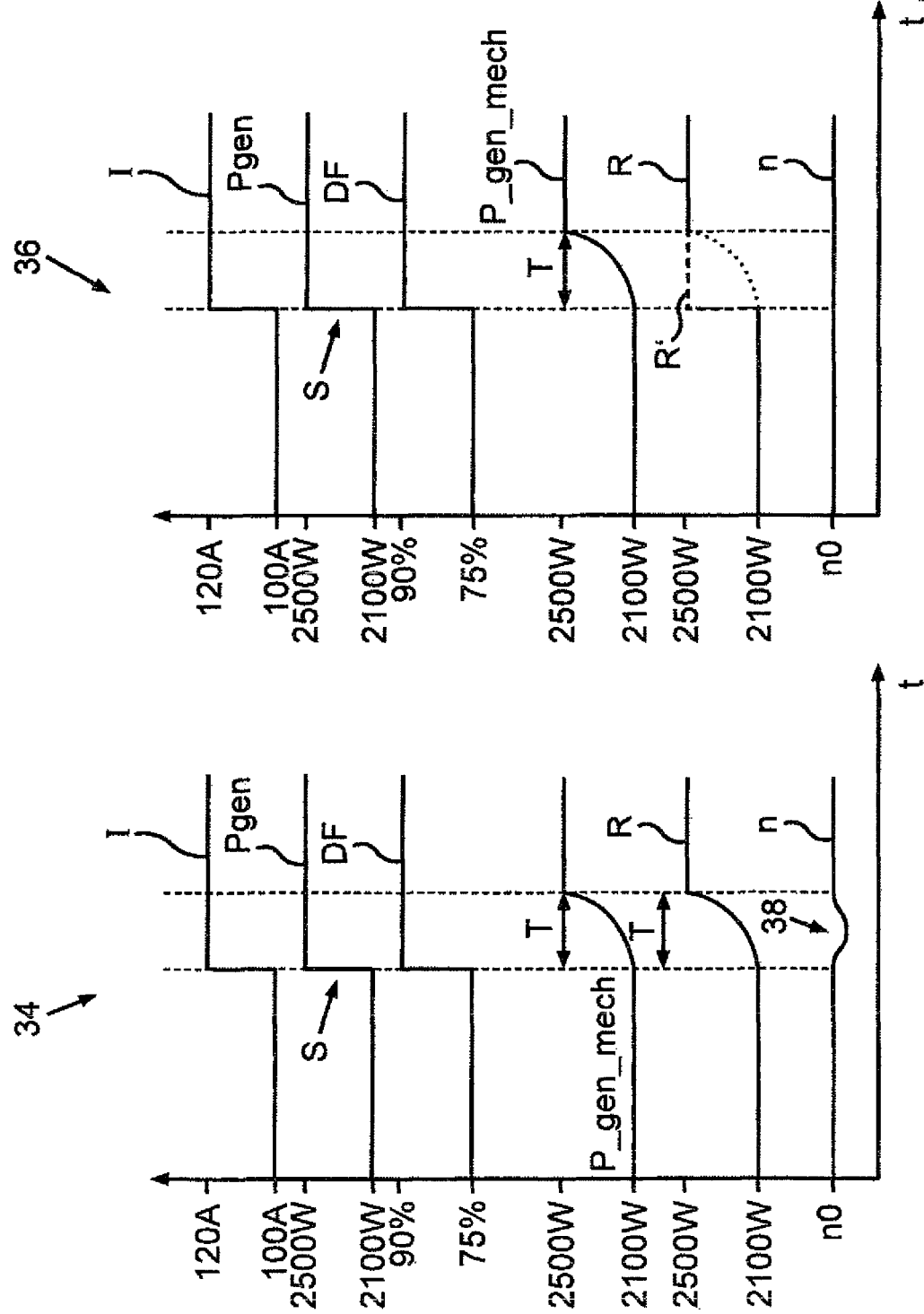

MOTOR VEHICLE HAVING A GENERATOR LOAD-DEPENDENT ENGINE CONTROL

CROSS-REFERENCES TO RELATED APPLICATIONS

This application is the U.S. National Stage of International Application No. PCT/EP2014/000532, filed Mar. 1, 2014, which designated the United States and has been published as International Publication No. WO 2014/173478 and which claims the priority of German Patent Application, Serial No. 10 2013 007 277.8, filed Apr. 26, 2013, pursuant to 35 U.S.C. 119(a)-(d).

BACKGROUND OF THE INVENTION

The invention relates to a method, wherein an operating parameter of an internal combustion engine in a motor vehicle is adjusted, for example the rotation speed of the internal combustion engine. The internal combustion engine hereby drives an electric generator of the motor vehicle. The present invention also relates to a motor vehicle in which a generator is coupled via an energy management unit with an engine control unit. The engine control unit hereby regulates an operating parameter of an internal combustion engine in response to an electric load connected to the generator.

A method and a motor vehicle of the aforementioned type are known, for example from DE 10 2008 004 269 A1. The excitation current of a motor-driven generator in a motor vehicle, in particular a truck, is here adjusted in a first control loop, while an intermediate circuit voltage generated by the generator is monitored in a second control loop, and a desired value for the excitation control is then determined therefrom. Optionally, an idle speed of the motor driving the generator can also be increased to provide a required drive power for the generator.

DE 10 2008 002 152 A1 describes a method for operating a drive unit of a vehicle, wherein a pilot control value for a load torque is corrected. With the method, the pilot control value which is often known only to the consumer at the idle speed can be relied upon, which can then be corrected with a known operational relationship, so that the load torques are adapted to the higher rotation speeds. Using a correction value obviates the need to use memory-intensive engine characteristics for the rotation speed-dependent adaptation of a pilot control value.

DE 198 20 395 A1 describes a DF signal generated in the voltage regulator of an alternator of a motor vehicle that indicates the utilization of the generator. This relates to a generator clock ratio for setting the output voltage of the generator by adjusting the excitation current by way of a two-position control with a square-wave voltage having a variable pulse width. The generator voltage decreases with increasing supplied output power, which must be introduced into the generator shaft by way of a corresponding mechanical drive power. The output power of the generator, or more precisely its efficiency, is hereby load-dependent and temperature-dependent. Therefore, the absolute mechanical power currently required by the generator cannot be inferred directly from the DF signal of the voltage regulator. For example, when the DF signal indicates a utilization rate of 70%, this can mean that the generator also requires two different mechanical drive powers at two different temperatures of the generator.

A generator model can therefore be used for determining characteristic values of the generator for an accurate regulation of the drive power for the generator shaft of the electric generator generated by an internal combustion engine of a motor vehicle. Such generator model is known, for example, from DE 10 2005 012 052 A1. The mechanical drive power required from the generator for generating the electric power can thus be determined with such a generator model, for example, based on operating variables of the generator, such as the aforedescribed duty ratio in the excitation (DF signal), the exciting current and the generator voltage. Such a relatively complex computational model has the disadvantage that, due to inherent signal and calculating transit times when determining the current parameter values, the calculation of the power value for the drive power and the transmission of the power value to the engine control unit is always delayed in relation to an actual change of load on the generator. This may have the consequence that, for example when controlling idling of an internal combustion by an engine control unit based on such power value, the response is not fast enough when an electrical load at the generator suddenly increases. This causes a drop in the rotation speed, i.e. the rotation speed drops by an undesirably large amount. For example, when a vehicle occupant turns on the air conditioning while the motor vehicle is idling, a reduction in the engine RPM is audible. The motor controller increases the engine speed only when an increased power demand is also signaled by the generator model, and the engine control unit then increases a control setpoint for rotation speed control or power control. A particularly undesirable effect arises with a cyclically activated electrical consumer, such as a windshield wiper. Since the current value calculated with the generator model is also cyclically transmitted to the engine control unit, a dynamic, cyclical superposition of the idle controller with the generator load may result, which can lead to an oscillation in the rotation speed.

SUMMARY OF THE INVENTION

It is the object of the invention to provide in a motor vehicle a control operation for adjusting an operating parameter of an internal combustion engine, which is robust with respect to sudden load changes of an electrical load at the generator of the motor vehicle.

The object is attained with a method for adjusting an operating parameter of an internal combustion engine in a motor vehicle, wherein the method includes driving an electric generator of the motor vehicle by the internal combustion engine, repeatedly determining with an energy management unit from at least one current parameter value of the generator a current power value of a mechanical drive power required by the generator, determining with an engine control unit a control setpoint value for a control operation for adjusting an operating parameter of the internal combustion engine as a function of the current power value determined by the energy management unit, monitoring an operating variable of the generator, which depends on an electrical load acting on the generator, and following a sudden load change of the electrical load: a) determining a value of a relative change in the operating variable caused by the sudden load change, and b) determining an adjusted control setpoint adapted to the sudden load change for a controlled operation irrespective of the current power value determined by the energy management unit, but as a function of the value. The object is also attained with a motor vehicle with an energy management unit configured to adjust an operation of an electric generator and of an internal combustion engine driving the electric generator, and with an engine control unit configured to adjust an operating variable of the internal combustion engine. The motor vehicle is configured to repeatedly determine with the energy management unit from at least one current parameter value of the generator a current power value of a mechanical drive power required by the generator, determine with the engine control unit a control setpoint value for a control operation for adjusting an operating parameter of the internal combustion engine as a function of the current power value determined by the energy management unit, monitor an operating variable of the generator, which depends on an electrical load acting on the generator, and following a sudden load change of the electrical load: a) determine a value of a relative change in the operating variable caused by the sudden load change, and b) determine an adjusted control setpoint adapted to the sudden load change for a controlled operation irrespective of the current power value determined by the energy management unit, but as a function of the value of the relative change in the monitored operating variable. Advantageous embodiments of the invention are recited in the dependent claims.

The method according to the invention is based on the described configuration that an internal combustion engine of a motor vehicle drives an electric generator of the motor vehicle. A current value of a mechanical drive power required by the power generator is determined repeatedly, for example cyclically, by an energy management unit from at least one current parameter value of the generator, such as the information about its excitation current or its generator voltage. The required drive power corresponds to the particular value that prevents the generator voltage in the electrical onboard system of the motor vehicle, in which the generator supplies the electrical power, from dropping below a predetermined minimum value. Preferably, a constant onboard system voltage is specified. A corresponding control set point is then determined by an engine control unit as a function of the power value for a controlled operation of the internal combustion engine, wherein an operating variable of the engine, i.e. for example its rotation speed or the supplied mechanical power, is adjusted by the controlled operation.

When the current power value indicates, for example, that the generator requires, for example, a power of 2.1 kW, a corresponding control setpoint for the operating variables of the internal combustion engine is set to a value, which results in the required drive power for the generator. The power value for the drive power is hence determined in the energy management unit from the parameter values of the generator and then utilized by the engine control unit for controlling the internal combustion engine. As already stated, the problem may here arise that the current power value is adjusted to the current load only with a delay. In the event of a sudden change of the electric load of the generator, it may not be possible to adapt the current power value quickly enough to the current required drive power.

According to the invention, an operating variable of the generator which is dependent on the electrical load acting on the generator is therefore additionally monitored. A sudden change in the electrical load thus changes immediately this operating variable. Particularly suitable operating variables have proven to be the generator load signal (also referred to as DF signal) of the voltage regulator of the generator and the current signal of the excitation current of the generator. Other suitable operating variables can be found based on simple experiments. According to the method of the invention, the relative change in the operating variable is determined following a sudden change in the electrical load, i.e. a value that describes the relative change, caused by the sudden load change. For example, the value may specify that the operating variable has increased by, for example, 20%. Such value is available immediately after the sudden load change and can be computed without the aforedescribed delays. Therefore, following the sudden load change, the control setpoint for the controlled operation of the internal combustion engine is initially changed independent of the (slowly adapted) power value of the energy management unit, but is changed as a function of the value of the relative change in the monitored operating variable, in order to adapt the control set point to the sudden load change.

Although the monitored operating variable may still be the DF signal, the prior art problem, namely that the calculated control setpoint, which is adapted to the sudden load change, would be inaccurate, is eliminated. Indeed, unlike in the prior art, the method according to the invention never attempts to deduce from the DF signal an absolute power value. Instead, the adjustment is made based on the relative change. The relative change of the operating variable reflects a relative change in the demand for drive power by the generator when the temperature and other environmental conditions remain almost constant. However, the temperature and other environmental conditions change only marginally immediately following a sudden load change. If an accurate control setpoint exists before the sudden load change, then a relatively accurately adjusted control setpoint can be determined immediately after the sudden load change (in particular within a time of less than one minute, preferably less than 15 seconds) based on the relative change in the operating variable of the generator.

The invention thus has the advantage that, immediately after a sudden load change, a control setpoint adapted to the sudden load change is available without the aforedescribed critical delay, which control setpoint is sufficiently accurate to adapt the operating parameter of the internal combustion engine to the current power demand of the generator in controlled operation.

The engine control can hereby perform any type of control for the controlled operation, and can in particular control, as an operating parameter of the internal combustion engine, an engine speed and/or engine power and/or an engine torque. Adjusting the drive power of the engine has the particular advantage that the current power value of the energy management unit can be directly adopted as the control setpoint. Only friction losses and the power required by other components may have to be included. In particular, if an idle control is performed by the engine control unit based on the method, the current power value can be used directly (plus the friction losses) as the control setpoint since no other components need to be driven.

The current power value can be calculated by the energy management unit in the aforedescribed manner based on a generator model, as is known in the prior art. The generator model can be very complex, because a time delay does no longer matter. This has the particular advantage that a highly accurate control setpoint can be determined with the generator model. The disadvantages caused by the generator model due to its slower computation of the performance value do not occur in the method according to the present invention because the control set point is adjusted, as needed, quickly enough and with only a negligible delay by the value of the relative change in the monitored operating variable following a sudden load change.

As already discussed, the value of the relative change may describe, for example, a percentage change in the operating variable. In this case, according to an advantageous further development, the control set point may simply be calculated by multiplying the value of the relative change with a control setpoint determined before the sudden load change or during the sudden load change. For example, when the control set point has a value of 2100 Watt before the sudden load change and a relative change in the drive power is plus 20% (power increase), the control setpoint must simply be multiplied by the factor 1.2 to obtain the adjusted control setpoint. When the control set point is calculated from intermediate variables because the rotation speed is controlled instead of the power, one of these intermediate variables can be multiplied by the value for the relative change.

Advantageously, a sudden load change is identified when the absolute value of the relative change is greater than a predetermined threshold value. In this way, it can be positively determined when the control setpoint should be adjusted based on the current exact power value of the energy management unit and when the control setpoint should be adjusted based the value of the relative change.

After a sudden load change, a switchover to a controlled operation must be reliably performed as a function of the current power value of the energy management unit. According to an embodiment of the method, if a predetermined time period has passed since detection of the last sudden change, control is again performed depending on the current power value of the energy management unit. According to an alternative embodiment, a difference between the adjusted control setpoint and the control setpoint determined from the current power value of the energy management unit is checked, with the control then being based on the latter, if the magnitude of the difference is smaller than a predetermined threshold value. The first variant reliably ensures a transition to the normal controlled operation, if the time period has elapsed. The second variant allows a very "smooth" transition because only a small difference in control behavior due to the threshold value results at the time of the switchover.

In order to obtain particularly small delays when adjusting the control setpoint, according to an embodiment of the method, the energy management unit routes a current value of the monitored operating variables (for example the DF signal) through to the engine control unit unchanged (also referred to as through-routing), with the adjusted control setpoint then being determined by the engine control unit itself.

As already stated, the invention also relates to a motor vehicle which is adapted to perform a method according to any one of the preceding claims. Preferably, the motor vehicle is designed as a passenger car.

BRIEF DESCRIPTION OF THE DRAWING

The invention will now be explained again with reference to a concrete exemplary embodiment. For this purpose, FIG. 2 shows a diagram with schematically depicted time-dependent profiles of several electrical and mechanical variables, which are obtained once in a controlled operation according to the prior art and once in a controlled operation when using an embodiment of the method according to the invention.

DETAILED DESCRIPTION OF PREFERRED EMBODIMENTS

Figure 1:
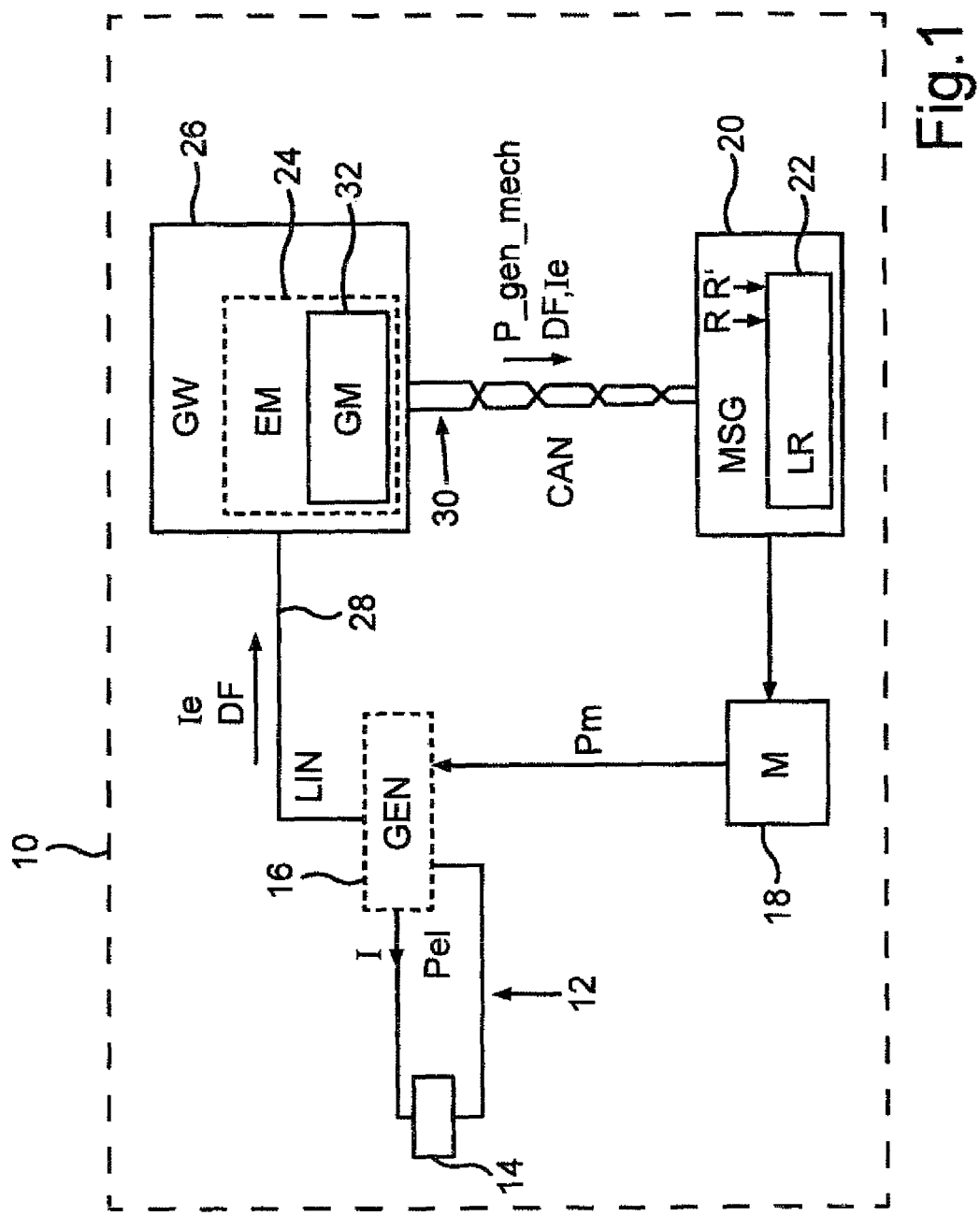
FIG. 1 shows a schematic diagram of a preferred embodiment of the motor vehicle according to the invention.

In the exemplary embodiments described hereinafter, the described components of the embodiments and the described steps of the method each represent individual features of the invention to be considered mutually independently, which further develop the invention in each case independently of each other and which can thus be regarded as part of the invention individually or in a combination different from the illustrated combination. Furthermore, the described embodiments are to be supplemented by other previously described features of the invention.

FIG. 1 shows a motor vehicle 10, which may be, for example, a passenger car. The motor vehicle 10 includes an onboard electrical system 12, via which electric power from an electric generator 16 (GEN) can be supplied to one or more electric loads 14. The generator 16 can be driven in a conventional manner by an internal combustion engine 18 (M), for example via a shaft or a belt. Here, the internal combustion engine 18 transmits mechanical power Pm to the generator 16. If one of the loads 14 is turned on or off, then the value of the electric power Pel supplied by the generator 16 to the onboard electrical system 12 changes abruptly.

For example, the generator 16 may regulate a vehicle system voltage in the onboard electrical system 12 to a constant value, so that a change in the electric power Pel received by the loads 14 causes a corresponding change in the vehicle system current l. The electrical power Pel received by the loads 14 from the generator 16 also referred to herein as an electrical load. A change in the electrical load, i.e. a change in the value of the electrical power Pel, causes a change of the torque to be provided by the engine 18 to the generator 16 when the rotation speed of the engine 18 is to remain constant.

For the further explanation of the exemplary embodiment, it will be assumed that the motor vehicle 10 is idling. The mechanical power Pm supplied by the internal combustion engine 18 then corresponds (excluding non-linear effects and friction losses) to the mechanical power received by the generator 16 and is converted by the generator 16 into the electrical power Pel. When a user now switches one of the electrical loads 14 in the vehicle 10 on while the motor vehicle 10 is idling, this causes a change in the received electrical power Pel, i.e. a sudden load change, within a short time. This sudden load change must be compensated by the internal combustion engine 18 if the speed of the internal combustion engine 18 is not to decrease. In particular, this may otherwise cause the engine 18 to stop, i.e. "stall", when the internal combustion engine 18 is idling.

The mechanical power Pm supplied by the internal combustion engine 18 is controlled by an engine control unit 20 (MSG), which controls the internal combustion engine 18 in a conventional manner. For the aforedescribed idling operation, the engine control unit 20 may have an idling speed control 22 (LR). A control set point R for the idling speed control 22 is determined e.g. by the engine control unit 20 itself, which reflects the mechanical power Pm required by the generator 16 in idling operation. The idling speed control 22 then controls the internal combustion engine 18 to this control setpoint R, so that the internal combustion engine 18 actually supplies the required mechanical power Pm.

The control set point R can only be calculated when the current mechanical power required by the generator 16 is known. For this purpose, the generator 16 is monitored by an energy management unit 24 (EM). The energy management unit 24 may be provided, for example, in a gateway 26 (GW) of a bus system of the motor vehicle 10, which can be connected with the generator 16 via a bus branch 28 and with the engine control unit 20 via another bus branch 30. The bus branch 28 may be, for example, a bus branch of a LIN bus (LIN—Local Interconnect Network), whereas the bus branch 30 may be, for example, a bus branch of a CAN bus (CAN—Controller Area Network).

The energy management unit 24 may be, for example, a software module that is executed by a processor unit of the gateway 26. The energy management unit 24 may at predetermined times receive via the bus branch 28 current values relating to the operating parameters of the generator 16. For example, the energy management unit 24 can thereby receive current parameter values for an excitation current and for a voltage regulation of the generator 16. For example, the DF signal of a—DF-monitor (DFM) may be determined as a parameter value of the voltage control.

The energy management unit 24 may include a generator model 32, which indicates as an estimate, based on of the received parameter values, the current mechanical power currently required by the generator 16 for providing to the electrical power Pel. This estimate of the mechanical power P_gen_mech is transmitted by the energy management unit 24 via the bus branch 30 to the engine control unit 20, which determines therefrom the control setpoint R. If the idling speed control 22 is a power control, then the estimated power P_gen_mech can be used directly as the control setpoint R. If the idling speed control 22 is a rotation speed control or a torque control, then P_gen_mech forms an intermediate variable and can be converted into a corresponding control setpoint R by using conversion factors that are known per se.

A time delay T results in the calculation of the estimated power value P_gen_mech due to measurement and transmission delays in the detection of the parameter values le and DF and in the transfer of the estimated power P_gen_mech and due to mathematical averaging of the temporal sequence of current parameter values in the generator model 32 for compensating noise effects. As a result, with a change of the electrical load in the onboard electrical system 12, a corresponding control setpoint R and thus a correspondingly changed mechanical power Pm supplied by the internal combustion engine 18 is available at the generator 16 only with time delay T, when only the estimated power value P_gen_mech is available. This can cause an undesirable change of a rotation speed n of the internal combustion engine 18. However, this is effectively prevented in the motor vehicle 10. For this purpose, the motor vehicle 10 is designed to carry out an embodiment of the method according to the invention.

It will now be explained with reference to FIG. 1 and FIG. 2 how an undesirably large change in the rotation speed n of the internal combustion engine 18 is prevented when a load changes abruptly, for example, when a load 14 in the onboard electrical system 12 is switched on, i.e. during a sudden increase in the power Pel. To this end, time profiles of operating variables of the motor vehicle 10 are plotted in FIG. 2 in two partial diagrams 34, 36 as a function of time t. The partial diagram 34 shows typical profiles known from the prior art, when the motor control is based only on the estimated power P_gen_mech. The partial diagram 36 shows profiles attained with the embodiment of the inventive method.

Both partial diagrams 34, 36 have as a starting point that one of the loads 14 is switched on, causing a sudden load change in the onboard electrical system 12, causing the onboard system current l (for an onboard electrical system voltage regulated to a constant value) to abruptly increase from for example 100A to 120A, resulting in a sudden load change S. The mechanical power Pgen required by the generator 16 for providing the corresponding electrical power Pel in the onboard electrical system 12 may increase in this example from 2100 watts to 2500 watts.

The voltage control of the generator 16 recognizes this increased power demand immediately based on the required change of the voltage control. The DF signal generated by the voltage control increases correspondingly quickly from a value of for example 75% to a value of 90%. That the DF signal indicating at a power of 2100 watts an utilization rate of 75% applies to the current operating state of the generator 16 only when the generator 16 is at a certain temperature and a certain excitation current le. For this reason, no conclusions can be drawn regarding the required generator power Pgen solely based on the DF signal. The setpoint R for the idling speed control 22 can therefore not be calculated directly based on the DF signal, in order to control the internal combustion engine 18 to a correspondingly high level, so that it can actually supply the required generator power Pgen as engine power Pm.

In order to obtain an appropriate control setpoint R for accurate control, the required generator power Pgen must therefore be calculated by the energy management unit 24 based on the current parameter values of the generator 16 as the estimated power value P_gen_mech of the generator model means 32. As stated above, the new value caused by the sudden load change S (Pgen=2500 watts in the example) can only be determined by the generator model 32 with time delay T. Correspondingly, the control setpoint R increases to the desired value only with a time delay T. The desired rotation speed value n0 of the internal combustion engine 18 cannot be maintained during this transition period due to the time delay T; instead, a drop 38 in the rotation occurs in the partial speed diagram 34 (prior art).

This is avoided in the motor vehicle 10. The partial diagram 36 shows that the same temporal profiles for the onboard system current l, the required generator power Pgen, the DF signal and estimated power P_gen_mech calculated by the model generator 32 can be obtained for the motor vehicle 10, Unlike in the prior art, an adjusted control setpoint R' is calculated here, for example by the engine control unit 20, immediately after the sudden load change S, i.e. still within the time delay T, and is then transmitted to the idling speed control 22 after the sudden load change S with a much shorter time delay than the time delay T. The idling speed control 22 thus regulates the mechanical power Pm supplied by the internal combustion engine 18 immediately to the required value of the generator power Pgen. Accordingly, the rotation speed n of the internal combustion engine 18 remains constant or nearly constant. More particularly, there is no drop 38 in the rotation speed.

This is made possible by through-routing, aside from the estimated power value P_gen_mech for determining the actually applied load level Pel, additionally, for example, the generator load signal DF (in %) from the energy management unit 24 (or the gateway 26 in general) to the engine control unit 20. A relative load change in the current load level can be detected in the engine control unit 20 with a shorter time delay based on the generator load signal DF. Since the temperature of the generator 16 cannot significantly change during a sudden load change, the control setpoint can be adapted quickly based on this relative change and based on the value of the generator power P_gen_mech that was determined very precisely by the generator model 32 at an almost constant load Pel before the sudden load change. For this purpose, the current generator load Pgen (here 2500 watts) caused by the sudden load change S is calculated. At the time just before the sudden load change, the current generator load as an absolute value (2100 watts)

and the idling speed are regulated and kept stable. The current generator load is in the example P_gen_mech=2100 watts. When a load of 20 amperes is added (see the graphs in FIG. 2), the DF signal increases commensurately almost immediately. In the example, the DE signal increases from 0.75 to 0.9. This corresponds to a relative change of +20%, Likewise, mechanical power Pgen actually received at the shaft of the generator also abruptly changes by about 20% (non-linear effects in the generator are neglected here). When the engine control unit now monitors in parallel the generator load change, which can be ascertained at the DF signal at least as a relative change, the value P_gen_mech determined before the sudden load change can then be increased internally by the engine control unit 20 by the determined 20%, resulting in P_gen_mech=2100 watts.times. 1, 2=2500 watts after the sudden load change. Thus, the idling speed control 22 can be operated with the control setpoint R' adapted to the sudden load change S, thus resulting in no or in only a small drop in speed of the rotation speed n.

In the example, the control is described for an idling speed control 22. However, the method according to the invention can also be used with any other control (i.e. also when driving the motor vehicle 10 with a coupled combustion engine 18). Instead of the DF signal, for example the current value of the excitation current Ie of the generator 16 can also be routed through to the engine control unit 20.

What is claimed is:

1. A method for adjusting an operating parameter of an internal combustion engine in a motor vehicle, comprising:
    driving an electric generator of the motor vehicle by the internal combustion engine,
    repeatedly determining with an energy management unit from at least one current parameter value of the generator a current power value of a mechanical drive power required by the generator,
    determining with an engine control unit a control setpoint value for a control operation for adjusting an operating parameter of the internal combustion engine as a function of the current power value determined by the energy management unit,
    monitoring with an energy management unit an operating variable of the generator, which depends on an electrical load acting on the generator, and following a load change of the electrical load
    determining a value of a change in the monitored operating variable caused by the load change, and
    determining an adjusted control setpoint adapted to the load change for a controlled operation irrespective of the current power value determined by the energy management unit, but as a function of the value of the change in the monitored operating variable.

2. The method of claim 1, wherein the monitored operating variable of the generator comprises a generator load signal of a voltage regulator of the generator or a signal of a magnitude of an excitation current of the generator.

3. The method of claim 1, and further comprising: controlling as the operating parameter of the internal combustion engine at least one of an engine rotation speed, an engine power and an engine torque.

4. The method of claim 1, wherein the engine control unit performs an idling speed control.

5. The method of claim 1, further comprising:
    simulating the generator with a generator model, and
    computing with the generator model the current power value determined by the energy management unit from the at least one current parameter value.

6. The method of claim 1, and further comprising: computing the adjusted control setpoint by multiplying the value of the change in the monitored operating variable with a control setpoint determined before or during the load change or by multiplying the value of the change in the monitored operating variable with an intermediate variable underlying this control set point.

7. The method of claim 1, and further detecting a load change when a magnitude of a value of the change in the monitored operating variable is greater than a predetermined threshold value.

8. The method of claim 6, wherein the control setpoint determined before or during the load change based on the current power value determined by the energy management unit forms the basis of the controlled operation instead of the adjusted control setpoint, when
    a predetermined time period has elapsed since the load change was detected, or
    an absolute difference between the adjusted control setpoint and the control setpoint determined based on the current power value determined by the energy management unit is smaller than a predetermined threshold value.

9. The method of claim 6, wherein the energy management unit routes a current value of the monitored operating variable through to the engine control unit unchanged, and wherein the adjusted control setpoint is calculated by the engine control unit.

10. A motor vehicle comprising:
    an energy management unit configured to adjust an operation of an electric generator and of an internal combustion engine driving the electric generator, and
    an engine control unit configured to adjust an operating variable of the internal combustion engine,
    wherein the motor vehicle is configured to
    repeatedly determine with the energy management unit from at least one current parameter value of the generator a current power value of a mechanical drive power required by the generator,
    determine with the engine control unit a control setpoint value for a control operation for adjusting an operating parameter of the internal combustion engine as a function of the current power value determined by the energy management unit,
    monitor with an energy management unit an operating variable of the generator, which depends on an electrical load acting on the generator, and following a load change of the electrical load
    determine a value of a change in the monitored operating variable caused by the load change, and
    determine an adjusted control setpoint adapted to the load change for a controlled operation irrespective of the current power value determined by the energy management unit, but as a function of the value of the change in the monitored operating variable.

* * * * *